(12) United States Patent
Yepez et al.

(10) Patent No.: US 12,743,936 B2
(45) Date of Patent: Sep. 22, 2026

(54) TRANSACTION GUIDANCE FOR SELF-SERVICE TERMINALS (SSTs)

(71) Applicant: NCR Voyix Corporation, Atlanta, GA (US)

(72) Inventors: Rafael Yepez, Duluth, GA (US); Matthew Robert Burris, Lawrenceville, GA (US); Levino Felix Perrucci, Mableton, GA (US)

(73) Assignee: NCR Voyix Corporation, Atlanta, GA (US)

(*) Notice: Subject to any disclaimer, the term of this patent is extended or adjusted under 35 U.S.C. 154(b) by 230 days.

(21) Appl. No.: 18/072,205

(22) Filed: Nov. 30, 2022

(65) Prior Publication Data

US 2024/0177577 A1 May 30, 2024

(51) Int. Cl.
*G06Q 20/18* (2012.01)
*G07G 3/00* (2006.01)

(52) U.S. Cl.
CPC ............. *G07G 3/006* (2013.01); *G06Q 20/18* (2013.01)

(58) Field of Classification Search
CPC ........ G07G 3/006; G07G 1/00; G07G 1/0009; G07G 1/0018; G07G 1/0036; G07G 1/0045; G07G 1/0063; G07G 1/01; G06Q 20/18; G06Q 30/0226; G06Q 20/20; G07F 17/0035
See application file for complete search history.

(56) References Cited

U.S. PATENT DOCUMENTS 5,115,888 A * 5/1992 Schneider ............ G06Q 20/208 235/383
5,256,864 A * 10/1993 Rando ................ G06K 7/10693 235/462.14
5,444,226 A * 8/1995 Collins, Jr. ........ G06K 7/10851 235/383
5,525,788 A * 6/1996 Bridgelall .......... G06K 7/10653 235/462.14
5,773,807 A * 6/1998 Barkan .............. G06K 7/10851 235/472.01
5,825,010 A * 10/1998 Charych ............ G06K 7/10792 235/472.01

(Continued)

FOREIGN PATENT DOCUMENTS

CN 102023049 A * 4/2011
CN 103456110 A * 12/2013 ........... G06F 1/1684

(Continued)

*Primary Examiner* — Ashford S Hayles
(74) *Attorney, Agent, or Firm* — Schwegman Lundberg & Woessner, P.A.

(57) ABSTRACT

States of a current transaction are monitored at a terminal. The transaction states are mapped to guidance data and the guidance data is dynamically projected onto a surface that is adjacent to a peripheral of the terminal or dynamically rendered on a display situated on the surface. The guidance data corresponds to an action that an operator of the terminal is expected to take or refrain from taking with respect to the peripheral in order to facilitate progression of the transaction at the terminal. The presentation of the guidance data at the surface provides proximity-based and context-based feedback to the operator during the transaction.

13 Claims, 5 Drawing Sheets

(56) References Cited

U.S. PATENT DOCUMENTS 6,056,087 A * 5/2000 Addy .................. G07G 1/0045 235/383
6,189,790 B1 * 2/2001 Walter ................ G07G 1/0036 235/383
6,408,407 B1 * 6/2002 Sadler ................ G06F 11/0736 714/48
7,481,360 B1 * 1/2009 Ramachandran .. G06Q 20/3821 235/379
7,953,635 B2 * 5/2011 Sasaki .................... G07G 1/009 235/383
9,092,050 B2 * 7/2015 Amada .................. G06Q 50/12
9,105,026 B1 * 8/2015 Edwards ............. G06F 3/04842
9,513,756 B1 * 12/2016 Mishra ..................... H04B 5/72
10,007,824 B1 * 6/2018 McQueen ........ G06K 19/06112
10,089,614 B1 * 10/2018 Catoe ................... G06Q 20/208
10,169,752 B2 * 1/2019 Katsumura .......... G06V 10/764
10,817,691 B1 * 10/2020 Wilfred ..................... G06T 7/13
10,958,807 B1 * 3/2021 Holub .................. G06K 7/1417
11,004,045 B1 * 5/2021 Montenegro ......... G07F 19/205
11,138,584 B1 * 10/2021 Catoe .................. G06Q 20/208
11,314,959 B1 * 4/2022 Alessandrini ........ G06K 7/1465
11,481,751 B1 * 10/2022 Chaubard .............. G06V 10/82
11,482,082 B2 * 10/2022 Farrow ................ G06V 40/161
11,727,229 B1 * 8/2023 Lupo .................... G06K 7/1443 235/462.14
11,928,660 B2 * 3/2024 Hawk .................... G06Q 20/18
2002/0047047 A1 * 4/2002 Poloniewicz ...... G06K 7/10722 235/454
2002/0074402 A1 * 6/2002 Latimer ............. G06K 7/10861 235/454
2002/0123932 A1 * 9/2002 Brenhouse ........... G06Q 20/204 705/16
2004/0118928 A1 * 6/2004 Patel .................... G06K 7/0004 235/472.01
2004/0182650 A1 * 9/2004 Harris ..................... A47F 9/047 186/66
2005/0092834 A1 * 5/2005 Latimer ............. G06K 7/10861 235/383
2006/0043185 A1 * 3/2006 Joseph ............... G06K 7/10722 235/455
2007/0051800 A1 * 3/2007 Muto ................... G07G 1/0054 235/383
2007/0205277 A1 * 9/2007 Tashiro ................ G07G 1/0036 235/383
2008/0164309 A1 * 7/2008 Latimer ........... G06Q 10/06398 235/383
2009/0084855 A1 * 4/2009 Herwig .............. G06K 7/10722 235/462.41
2009/0171798 A1 * 7/2009 Sasaki .................... G07G 1/009 705/17
2009/0171801 A1 * 7/2009 Ryo .................... G06F 3/04886 705/16
2009/0182638 A1 * 7/2009 Taylor .................. G07G 1/0045 705/17
2009/0194593 A1 * 8/2009 Kurihara ................ G07G 3/006 235/462.41
2009/0322706 A1 * 12/2009 Austin .................... G06F 3/038 345/175
2010/0200656 A1 * 8/2010 Marshall .............. G07G 1/0036 235/383
2010/0282850 A1 * 11/2010 Olmstead ........... G06K 7/10722 235/440
2011/0127333 A1 * 6/2011 Veksland ............. G06K 7/1096 235/462.24
2011/0198400 A1 * 8/2011 Sano .................... G06K 7/1443 235/470
2011/0225055 A1 * 9/2011 Takahashi ............ G07G 1/0045 705/16
2012/0150589 A1 * 6/2012 Xian .................. G06K 7/10821 705/7.42
2012/0187194 A1 * 7/2012 Svetal .................. G06G 1/0063 235/470
2013/0008959 A1 * 1/2013 Adamec ............. G01G 19/4144 235/383
2013/0062413 A1 * 3/2013 Nahill ................ G06K 7/10198 235/462.25
2013/0254044 A1 * 9/2013 Catoe ................... G07G 1/0072 705/16
2013/0256041 A1 * 10/2013 Collins, Jr. ........ G01G 19/4144 177/2
2013/0320091 A1 * 12/2013 Detwiler .............. G07G 1/0045 235/462.11
2013/0327835 A1 * 12/2013 Thompson ......... G06K 7/10831 235/470
2014/0195360 A1 * 7/2014 Kubota ................ G07G 1/0036 705/16
2015/0193761 A1 * 7/2015 Svetal .................. G06Q 20/208 705/23
2015/0379494 A1 * 12/2015 Hiroi ...................... G06V 10/25 705/16
2016/0048715 A1 * 2/2016 McQueen .......... G06K 7/10871 235/462.2
2016/0189489 A1 * 6/2016 Au ....................... G06K 7/1413 235/383
2016/0292468 A1 * 10/2016 Madej .................. G06Q 20/208
2016/0292475 A1 * 10/2016 Madej ................... G06F 16/907
2017/0061817 A1 * 3/2017 Mettler May ........ A61B 5/1124
2017/0337763 A1 * 11/2017 Susaki ..................... G07D 1/02
2018/0075503 A1 * 3/2018 Ryner ................... G06F 16/275
2018/0096332 A1 * 4/2018 O'Herlihy ............ G08B 21/182
2018/0157881 A1 * 6/2018 Beghtol ............. G06K 7/10792
2018/0189763 A1 * 7/2018 Olmstead ............... G06V 10/42
2018/0308084 A1 * 10/2018 Naito ................... G07G 1/0063
2019/0180264 A1 * 6/2019 Crooks .................. H04N 7/183
2019/0303937 A1 * 10/2019 Sanchez-Llorens ..... G07G 1/01
2020/0037981 A1 * 2/2020 Bechwati ............... G16H 30/40
2020/0056929 A1 * 2/2020 Kempf ................. G01G 19/415
2020/0202681 A1 * 6/2020 Crooks ................ G07G 1/0009
2020/0234056 A1 * 7/2020 Pricochi ............. G06Q 30/0609
2020/0410312 A1 * 12/2020 Holub .................... G06V 10/30
2021/0004778 A1 * 1/2021 Kurotsuka ............. G07D 11/60
2021/0097517 A1 * 4/2021 Handshaw ............ G06V 10/25
2021/0110123 A1 * 4/2021 Brock .................. G06K 7/1413
2021/0117949 A1 * 4/2021 Guo .......................... G06T 7/70
2021/0133720 A1 * 5/2021 Johnson .................... G07G 1/01
2021/0190580 A1 * 6/2021 Barkan .............. G06K 7/10742
2021/0216785 A1 * 7/2021 Debucean ........... G06F 18/2415
2021/0280027 A1 * 9/2021 Wen ................. G08B 13/19608
2021/0374375 A1 * 12/2021 Gururaja .............. G06K 7/1439
2021/0374699 A1 * 12/2021 Barkan .................. G06V 20/64
2021/0406918 A1 * 12/2021 Astvatsaturov ...... G06K 7/0004
2022/0061816 A1 * 3/2022 Lee ...................... A61B 8/5207
2022/0067321 A1 * 3/2022 Costello ............... G06K 7/1404
2022/0067895 A1 * 3/2022 Maeda ................... G06Q 20/18
2022/0233171 A1 * 7/2022 Johnson ................. A61B 8/585
2023/0027855 A1 * 1/2023 Dheeraj Raju ........ G06N 20/00
2023/0043615 A1 * 2/2023 Saitoh .................... G07G 1/009
2023/0056327 A1 * 2/2023 Brakob ................ G07G 1/0081
2023/0058903 A1 * 2/2023 Möller ................. G06Q 20/202
2023/0095037 A1 * 3/2023 Slaughter ............... G06N 20/10 705/23
2023/0114364 A1 * 4/2023 Gurevich ........... G06K 7/10732 235/454
2023/0125326 A1 * 4/2023 Ushijima ............. G06Q 20/208 705/23
2023/0127469 A1 * 4/2023 Yamamoto ............ G06V 10/82 382/159
2023/0130674 A1 * 4/2023 Yamamoto ............. G06T 7/194 382/159
2023/0297985 A1 * 9/2023 Hawk ...................... G07G 1/01 705/23
2024/0119512 A1 * 4/2024 Musiani ................. G06V 20/52
2024/0153361 A1 * 5/2024 Thompson ............. G06V 20/52

FOREIGN PATENT DOCUMENTS

CN 112185030 A * 1/2021
DE 3723316 C1 * 10/1988
DE 19518888 C2 * 5/1999 ............ A47F 9/047

(56) References Cited

FOREIGN PATENT DOCUMENTS

| | | | | | |
|---|---|---|---|---|---|
| GB | 2537405 | A | * | 10/2016 | ........... G06Q 20/208 |
| JP | 2004511813 | A | * | 4/2004 | ............. G06Q 10/06 |
| JP | 2006134010 | A | * | 5/2006 | |
| JP | 2017102749 | A | * | 6/2017 | |
| JP | 7172060 | B2 | * | 11/2022 | ............. G06F 3/048 |
| WO | WO-0233647 | A1 | * | 4/2002 | ....... G06Q 10/06398 |
| WO | WO-2010075131 | A2 | * | 7/2010 | ............. G06Q 30/06 |
| WO | WO-2015145977 | A1 | * | 10/2015 | ........... G06Q 20/208 |
| WO | WO-2021176840 | A1 | * | 9/2021 | ........... G06Q 20/208 |

* cited by examiner

TRANSACTION GUIDANCE FOR SELF-SERVICE TERMINALS (SSTs)

BACKGROUND

Self-checkout users often get confused regarding how to use a Self-Service Terminal (SST, e.g., self-checkout machine). For example, to pay for goods and services at an SST, users need to insert a form of payment (e.g., coins, notes, or payment cards) into the correct peripheral location, and if they fail to do so, transaction delays can occur, or even worse, the SST can experience a jam and go offline. Users also often get stuck in different portions of their transaction at an SST because they do not know what the next step in the process is supposed to be. For example, a user may be unaware that they should make a selection from a variety of candidate items when an item lacks a scan code (e.g., produce items).

To complicate matters, during the checkout process at an SST, reading instructions presented on the SST's customer display may be difficult or impossible for a sight-impaired customer to see. These type of customers and other customers who may suffer from other ailments/conditions often attempt to guess at what their next action should be when the SST appears to be idle and awaiting an action from the customer, further frustrating the customer experience.

SUMMARY

In various embodiments, a system and methods for transaction guidance for Self-Service Terminals (SSTs) are presented. The transaction guidance may be provided in the form of projections or displays on surfaces of the SST. In an example embodiment, an SST includes one or more projectors and/or is interfaced to one or more displays situated on outer surfaces of the SST adjacent to peripherals of the SST. Self-checkout states are monitored and mapped to predefined animations and/or graphics, such that when a current state for a current transaction is detected, the projector projects a corresponding animation/graphic on a corresponding surface of the SST and/or the animation/graphic is presented on a display at the corresponding surface. The presentation of the animation/graphic at a given surface of the SST and/or on a given display provides proximity-based and context-based real-time transaction guidance to the customer.

DETAILED DESCRIPTION

Figure 1A:
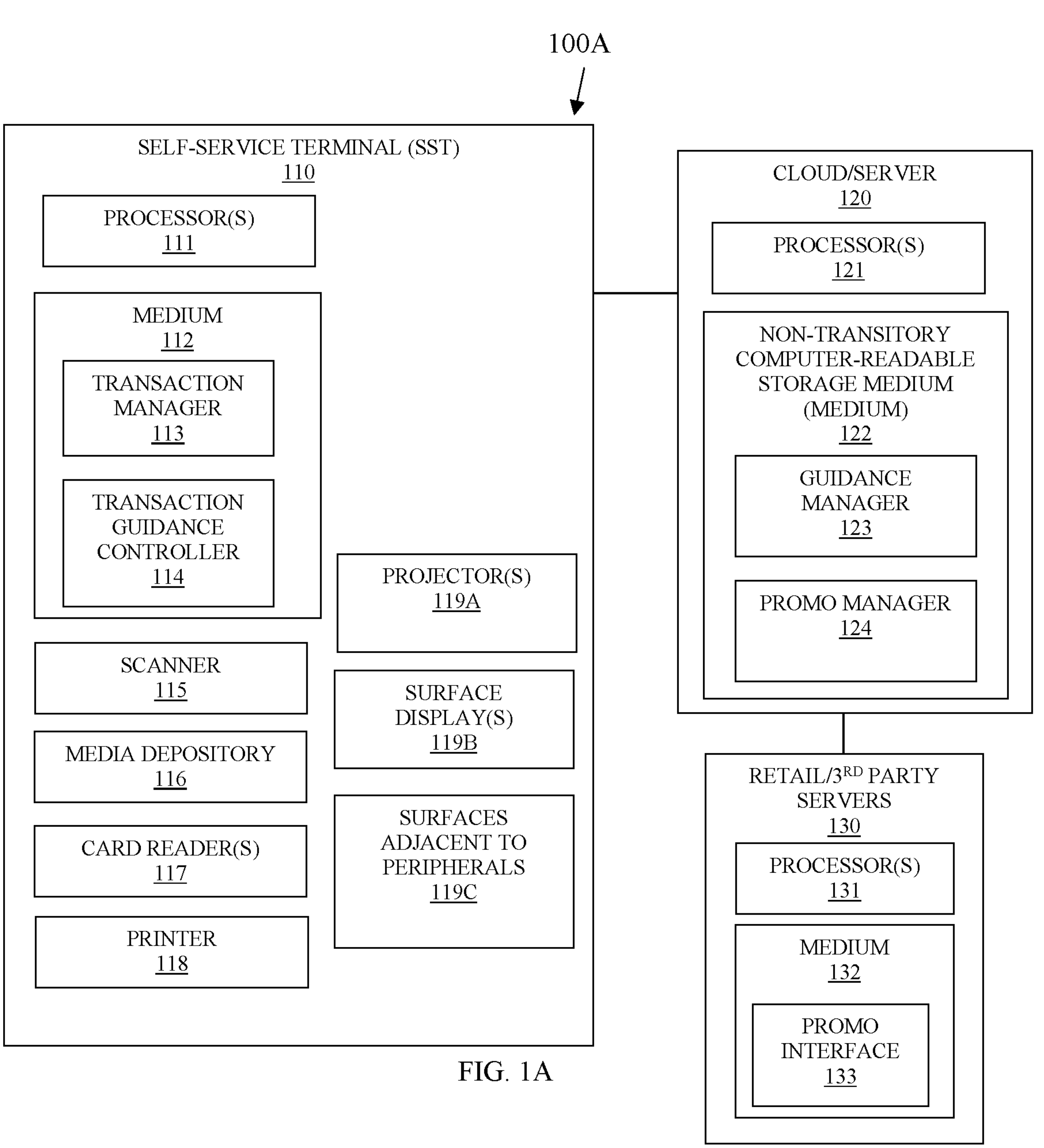
FIG. 1A is a diagram of a system for transaction guidance projections and/or displays on surfaces of SSTs, according to an example embodiment.

Operation of an SST can become confusing for self-checkout customers at times. For instance, the location of certain peripherals (e.g., cash or coupon inputs) may not be intuitive for certain customers. In other cases, customers may be confused as to the location of a barcode scanner. In still other cases, customers may become confused as to the next step they need to perform in the transaction flow. These types of customer confusion often result in an intervention, whereby support staff has to come to the SST and assist the customer with their transaction. In many of these interventions, the SST has not actually failed, rather the customer is simply confused as to what is being asked of them through the transaction interface of the SST.

The teachings presented herein and below provides technical solutions to the aforementioned technical problems associated with the use and operation of SSTs. In example embodiments, an SST includes a projector or is interfaced to a thin-film display. A given transaction state is synchronized with animations and graphics that are displayed on surfaces which may be adjacent to peripherals of the SST. The surfaces can include thin-film displays to present the animations and graphics. In some embodiments, a projector may project the animations and graphics onto the surfaces. The animations and graphics may direct the customer's attention and focus to the peripheral that the customer is expected to operate in some fashion. Example types of customer actions/operations with respect to which the animations/graphics provide guidance include passing item codes over a scanner window, inserting currency into a currency slot, inserting a payment or loyalty card into a card slot, placing a wireless-enabled card over a wireless card reader, and so forth. A transaction manager of the SST may detect transaction states, and the transaction manager or a separate application that is notified of each transaction state may determine—based on a current state—a given surface from a plurality of surfaces of the SST that a given animation and/or a given graphic are to be displayed on as transaction guidance to the customer during the customer's transaction. Dynamic intuitive animations and graphics are rendered on surfaces adjacent to peripherals of the SST to provide real-time transaction guidance to the customer when the customer is operating the SST for a self-checkout transaction.

As used herein the terms "consumer," "user," and "customer" may be used synonymously and interchangeably and may refer to an individual who is performing a transaction at an SST.

"Guidance data" may refer to an animation, graphic, text, video, or combination thereof presented to an operator of a terminal on or at a surface adjacent to a peripheral of the terminal during a transaction at the terminal. The guidance data provides feedback during the transaction to the operator as to whether a workflow associated with the transaction is or is not expecting the operator to interact with the peripheral and perform an action to progress the transaction towards completion. The terms and phrases "animation," "graphic," "animation/graphic" or variants thereof may be used herein and below interchangeably and synonymously with the phrase "guidance data" or "guidance information."

FIG. 1A is a diagram of a system 100A for generating and projecting transaction guidance on surfaces of SSTs and/or rendering the transaction guidance on displays associated with surfaces of SSTs, according to an example embodiment. The system 100A is shown schematically in greatly simplified form, with only those components relevant to understanding of one or more embodiments (represented herein) being illustrated. The various components are illustrated, and the arrangement of the components is presented for purposes of illustration only. It is to be noted that other arrangements with more or less components are possible without departing from the teachings of projecting/controlling transaction guidance on surfaces or displays on surfaces of an SST during a transaction presented herein and below.

Moreover, various components are implemented as one or more software modules, which reside in non-transitory storage and/or hardware memory as executable instructions that when executed by one or more hardware processors perform the processing discussed herein and below.

System 100A includes an SST 110, optionally a cloud 110 or a server 110 (hereinafter referred to as "cloud 110"), and optionally retail or third-party servers 130. SST 110 includes at least one processor 111 and a non-transitory computer-readable storage medium (hereinafter "medium") 112, which includes a transaction manager 113 and optionally a transaction guidance controller 114. The transaction manager 113 and the transaction guidance controller 114 include respective executable instructions, that when provided to processor 111 cause processor 111 to perform operations discussed herein and below for 113 and 114, respectively. SST 110 also includes a variety of peripherals, such as and by way of example only, a scanner 115, a media depository 116, card readers 117, and a printer 118. The SST 110 also includes surfaces 119C that are adjacent to the peripherals, one or more projectors 119A, and/or one or more surface-situated displays 119B.

Optionally, system 100A includes cloud 120. Cloud 120 includes a processor and a medium, which includes a guidance manager 123 and a promotional (hereinafter just "promo") manager 124. The guidance manager 123 and the promo manager 124 include respective executable instructions, that when provided to processor 121 cause processor 121 to perform operations discussed herein and below for 123 and 124, respectively.

Optionally, system 100A includes one or more retail/third-party servers 130. Each server 130 includes at least one processor 131 and medium 132, which includes a promo interface 133. The promo interface 133 includes executable instructions, that when provided to processor 131 cause processor 131 to perform operations discussed herein and below for 131.

Initially, in an example embodiment, SST 110 is configured such that states of a transaction being processed are monitored by transaction manager 113 and/or reported by transaction manager 113 to transaction guidance controller 114. A mapping is maintained between states of a transaction with predefined animations and/or graphics. The states can include "expecting current input" (e.g., notes and/or coins), "expecting keyed input" (e.g., from a customer transaction touch display (not depicted in FIG. 1A)), "expecting a scanned item" (e.g., from the scanner 115), "expecting card input" (e.g., from a specific card reader 117, such as card slot or card transceiver), "expecting coupon input" (e.g., through entry on the customer transaction touch display or from the scanner 115), "printing a coupon and/or receipt at the printer 118," etc. Each entry in the mapping can include an identifier linked to the transaction state, a surface identifier linked to a peripheral surface 119C associated with the state, and one or more predefined animations/graphics data files to render on the surface in association with the state. In an embodiment, each entry in the mapping also includes a projector identifier for a projector 119A or a surface display identifier for a surface display 119B. In an embodiment, each entry further includes a link for externally obtaining the animation/graphic data file.

During operation of system 100A, transaction manager 113 and/or transaction guidance controller 114 identifies a transaction state during a customer's self-service transaction and accesses the mapping. The mapping links the state identifier for the state to the animation/graphic data file, the projector 119A and/or the surface display 119B, and the surface 119C. Manager 113 or 114 obtains the animation/graphic data file and causes it to be projected via the corresponding projector 119A on the corresponding surface 119C or provides the animation/graphic file to the corresponding surface display 119B to render at the corresponding surface 119C.

As the states progress during the transaction, the animation/graphic presented on the surfaces 119C via projectors 119A and/or surface displays 119B are automatically updated and transitioned. As such, the transaction manager 113 continuously guides the customer through expected next operations and actions via the animation/graphic projected onto the relevant surface 119C or played at the relevant surface 119B on a surface display 119B.

In an embodiment, manager 113 or 114 dynamically acquires the animation/graphic from the mapping using a link to the externally-located animation/graphic data file. This can be provided from cloud/server 120. Additionally or alternatively, a retail/third-party server 130 may provide the externally-located animation/graphic data file.

In an embodiment, guidance manager 123 receives the current states of a given transaction directly from manager 113 or 114. Guidance manager 123 maintains the mapping for the SST 110 remotely and sends identifiers back to manager 113 or 114 for the animation/graphic data file, the surface 119C, the projector 119A, and/or the surface display 119B.

In an embodiment, predefined or dynamically acquired animation/graphic data files can be played via projectors 119A and/or surface displays 119B when the state of the SST 110 is idle. These animations/graphics may include promotions or advertisements provided through promo interface 133 to promo manager 124, and which may be included in the mapping for a given SST 110 by guidance manager 123 through interaction with manager 113 or 114. These animations/graphics may be used to attract the customers to the SST 110 when the SST 100 is not actively processing a transaction for a customer. In an embodiment, a bank of idle SSTs 110 simultaneously play animations/graphics on one or more their surfaces 119B in unison with one another. For example, a message and logo for a local sports team involved in an upcoming game or associated with winning a big game that is of local significance to customers of a store in a given geographical location may be presented.

In an embodiment, the mapping can be customized for the consumer rather than for the SST 110. For example, a customer's loyalty number can identify a specific mapping for specific animation/graphic data files determined to be relevant to a purchase history or loyalty activity of the customer. The animation/graphic data files can have a theme (e.g., color, design, background, etc.) relevant to a known interest of the customer, such as a known sports team, etc. The content of the animation/graphic can remain the same but the theme in which the content is presented can be customized to interests of the customer via analysis of the customer's loyalty and purchase activity. In an embodiment, the loyalty interface to a loyalty system permits the customer to define their own themes or look and feel for their proximity-based and context-based transaction guidance for their self-service transactions.

It is to be noted that although the terms animations and graphics are discussed herein, the presented data on the surfaces 119B can also include text, rolling text, still images, videos, animations, graphics, or any combination thereof. In fact, custom visual information with any custom visual effects can be provided with a given animation/graphic data file.

The animation/graphic data files are designed to provide real-time proximity-based and context-based guidance or feedback to the customer during the customer transaction. The presented animation/graphic is proximity-based because it is presented on a surface 119C that is adjacent to a peripheral that the customer is expected to operate at that point in the transaction and the animation/graphic is context-based because it is relevant to an action that the customer is expected to perform at that point in the transaction using the designated peripheral.

Thus, system 100A permits dynamic information to be projected or displayed directly on surfaces 119C adjacent to relevant peripherals during transactions as proximity-based and context-based transaction guidance or feedback to a customer engaged in a self-service transaction at an SST 110. This dynamic information can also be projected or displayed on the surfaces 119C when the SST 110 is in an idle state and not actively processing transactions for purposes of advertisements, promotions, enticing customers, celebrating community events, reminding customers of important upcoming community events, etc. The animations/graphics can be predefined and/or dynamically acquired. The look and feel of the animations/graphics can be customized to the customers, a store associated with the SST 110, and/or a community in which the SST 110 is located.

Figure 1B:
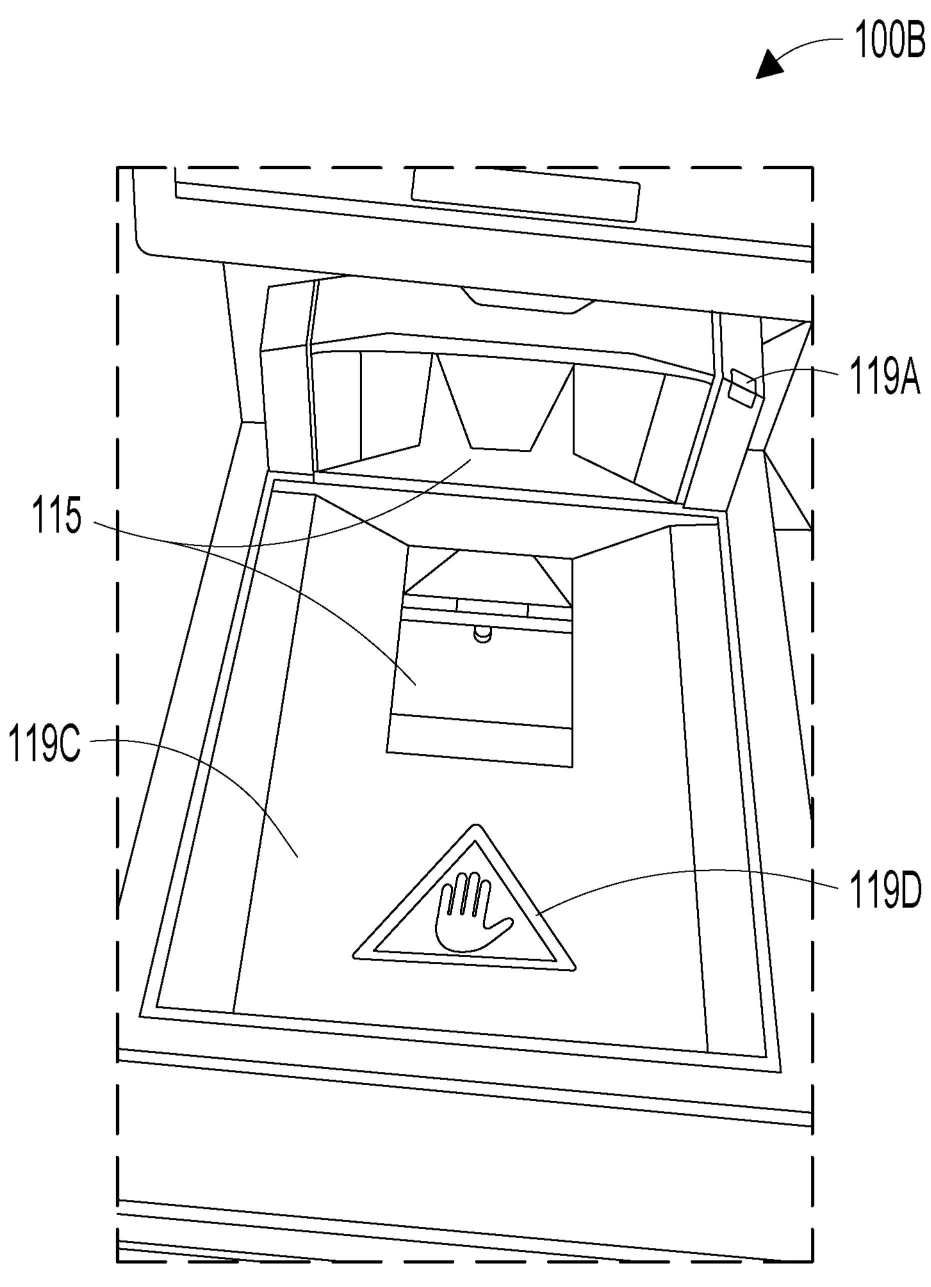
FIG. 1B is a diagram of a guidance projection on a surface of an SST for the system of FIG. 1A, according to an example embodiment.

FIG. 1B is a diagram 100B of a guidance projection on a surface of an SST for the system 100A of FIG. 1A, according to an example embodiment. It is to be noted that 100B represents one embodiment of system 100A and other embodiments are also available as was discussed above with FIG. 1A.

FIG. 1B depicts a bioptic scanner 115 that includes a vertical scan window and a horizontal scan window. Transaction manager 113 monitors the scanner 115 for item codes passed in front of the windows for purposes of reading the item codes for a transaction at SST 110. When a customer starts a transaction at the SST 110, the state of the transaction is expecting the customer to pass an item barcode label in front of one of the scanner windows.

But if the state is one in which manager 113 is expecting the customer to manually enter an item code or search for an item via a transaction interface of the transaction touch display or manager 113 is expecting the customer to provide a pay method for a completed transaction, then manager 113 is not expecting to see any barcode label from the customer via the scan windows. In this state, manager 113 or 114 uses a current state identifier for the current state of the transaction and searches the mapping to obtain an animation/graphic data file associated with a triangle with a hand put in it illustrating a stop or no action. Manager 113 or 114 uses projector 119A to project the animation/graphic onto horizontal surface 119C of scanner 115 adjacent to the horizontal window of the scanner 115. This lets the customer realize quickly that the SST 110 is not expecting an item to be scanned but is expecting something else, such as for the customer to lookup an item via the transaction touch display or for the customer to provide payment.

Figure 1C:
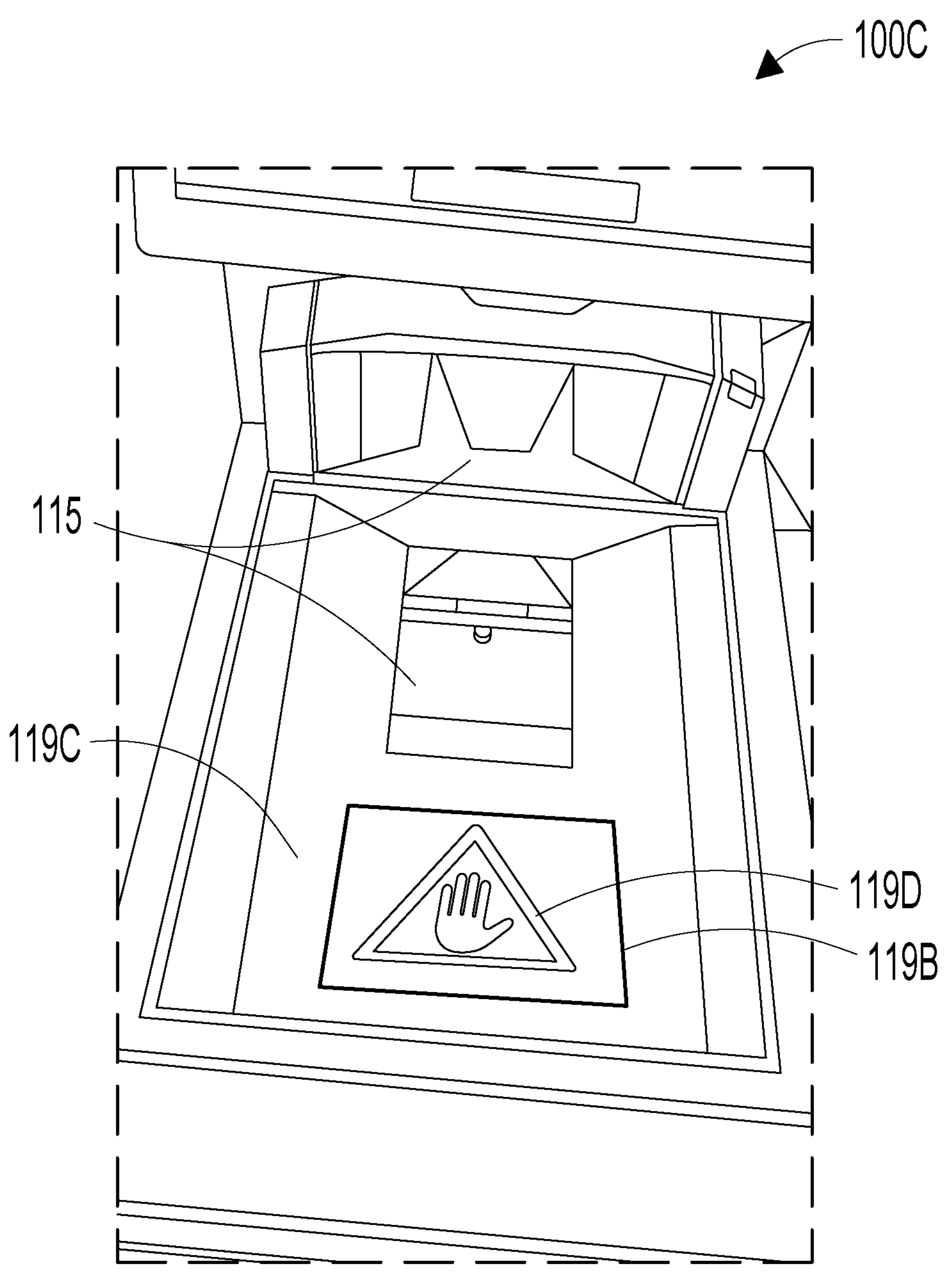
FIG. 1C is a diagram of a graphic displayed on a display at a surface of the SST for the system FIG. 1A, according to an example embodiment.

FIG. 1C is a diagram 100C of a graphic displayed on a display at a surface of the SST for the system FIG. 1A, according to an example embodiment. FIG. 1C presents the same animation/graphic for a same transaction state on a same surface 119C of scanner 115. However, rather than using projector 119A, manager 113 or 114 provides the animation/graphic to a surface display 119B and display 119B presents the animation/graphic.

In an embodiment, surface display 119B is integrated into surface 119C. In an embodiment, surface display 119B is attached to the top and exterior of surface 119C. In an embodiment, surface display 119B is a thin-film display. In an embodiment, surface display 119B is an LCD or a liquid quartz display. In an embodiment, the surface display 119B can be any type of display.

In an embodiment, SST 110 includes two or more projectors 119A, two or more surface displays 119B, and at least one projector 119A and at least one surface display 119B. In an embodiment, two or more surfaces 119C of the SST 110 are adapted to present two or more animations/graphics simultaneously during a given transaction and/or when the SST 110 is in an idle state.

In an embodiment, the SST 110 is capable of being operated in two modes. A first mode for self-service transactions of customers and a second mode for cashier-assisted transactions performed by cashiers on behalf of the customers. The proximity-based and context-based transaction guidance or feedback can be provided in both modes of operation.

Figure 2:
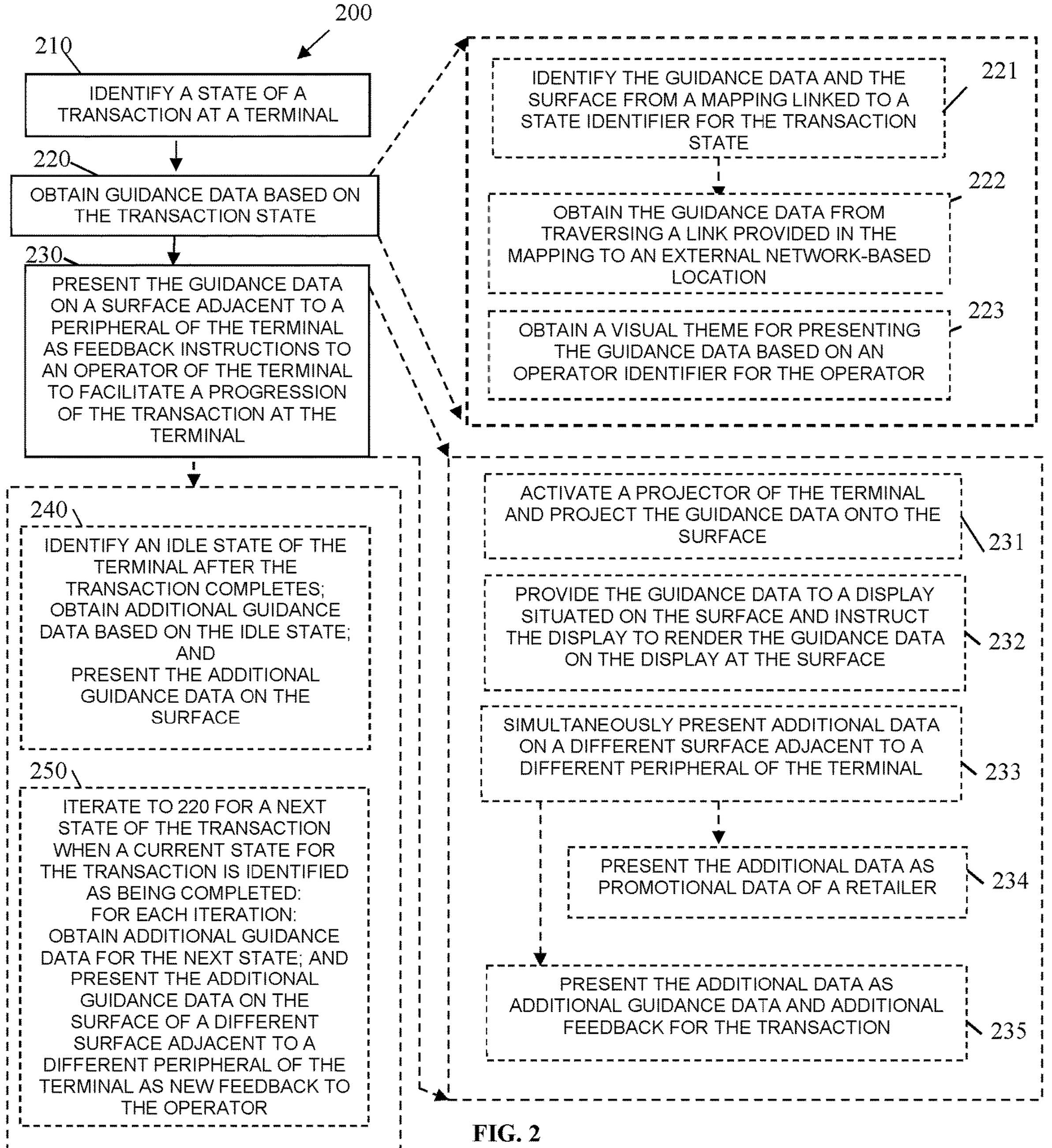
FIG. 2 is a flow diagram of a method for projecting transaction guidance on a surface of an SST during a transaction, according to an example embodiment.

The embodiments of FIGS. 1A, 1B, and 1C and other embodiments are now discussed with reference to the FIGS. 2 and 3. FIG. 2 is a flow diagram of a method 200 for projecting transaction guidance on a surface of an SST during a transaction, according to an example embodiment. The software module(s) that implements the method 200 is referred to as a "proximity and contextual transaction guidance manager." The proximity and contextual transaction guidance manager is implemented as executable instructions programmed and residing within memory and/or a non-transitory computer-readable (processor-readable) storage medium and executed by a plurality of hardware processors of a plurality of hardware computing devices. The processors of the devices that execute the proximity and contextual transaction guidance manager are specifically configured and programmed to process the proximity and contextual transaction guidance manager. The proximity and contextual transaction guidance manager has access to one or more networks during its processing. The networks can be wired, wireless, or a combination of wired and wireless.

In an embodiment, the device that executes the proximity and contextual transaction guidance manager is SST 110. In an embodiment, multiple devices cooperate to execute the proximity and contextual transaction guidance manager and the multiple devices include SST 110 and cloud 120. In an embodiment, proximity and contextual transaction guidance manager is transaction manager 113, transaction guidance controller 114, guidance manager 123, and/or promo manager 124.

At 210, the proximity and contextual transaction guidance manager identifies a state of a transaction terminal 110. The state is reported from a transaction manager 113 that executes on the terminal 110. Transaction manager 113 or an agent that processes on the terminal 110 such as transaction guidance controller 114 can monitor for changes in transaction state.

At 220, the proximity and contextual transaction guidance manager obtains guidance data based on a change in state for a transaction at the terminal 110. That is, state identifiers for the states are mapped to guidance data. The guidance data can be any of the types of visible data discussed above with system 100A.

In an embodiment, at 221, the proximity and contextual transaction guidance manager identifies the guidance data and the surface from a mapping that is linked to a state identifier for the state. The mapping includes an entry that at least includes the state identifier, a surface identifier for the surface, and an identifier for obtaining the guidance data.

In an embodiment of 221, and at 222, the proximity and contextual transaction guidance manager obtains the guidance data from traversing a link provided in the mapping to an external network-based location. Thus, the guidance data can be dynamically acquired from a source that is external to the terminal 110.

In an embodiment, at 223, the proximity and contextual transaction guidance manager obtains a visual theme for presenting the guidance data based on an operator identifier for the operator. For example, if the operator is a customer, the operator identifier may be a loyalty account identifier linked to a theme for presenting the guidance data customized to the customer based on the customer's loyalty history. The customer may also custom-define the theme via a profile linked to the customer within the customer's loyalty account. In cases where the terminal is a point-of-sale (POS) terminal and the transaction is a cashier-assisted transaction, the operator is a cashier. The cashier identifier may be linked to a cashier-selected theme provided by a store associated with the terminal 110.

At 230, the proximity and contextual transaction guidance manager presents the guidance data on a surface adjacent to a peripheral of the terminal 110 as feedback instructions to the operator of the terminal 110 in order to facilitate a progression of the transaction at the terminal towards completion. The feedback can be affirmative indicating that the operator is to interact with a given peripheral or cautionary indicating that the operator is not to interact with the given peripheral.

In an embodiment, at 231, the proximity and contextual transaction guidance manager activates a projector 119A of the terminal 110 and projects the guidance data onto the surface. An example of this was illustrated and discussed in diagram 100B of FIG. 1B above.

In an embodiment, at 232, the proximity and contextual transaction guidance manager provides the guidance data to a display 119B situated on the surface and instructs the display 119B to render the guidance data on the display 119B at the surface. An example of this was illustrated and discussed in diagram 100C of FIG. 1C above.

In an embodiment, at 233, the proximity and contextual transaction guidance manager simultaneously presents additional data on a different surface adjacent to a different peripheral of the terminal 110. That is, multiple sets of guidance data can simultaneously be presented to the operator during the transaction on different surfaces based on the current transaction state.

In an embodiment of 233, and at 234, the proximity and contextual transaction guidance manager presents the additional data as promotional data of a retailer. The promotional data can be provided through promo interface 133 to promo manager 124 and guidance manager 123 may instruct manager 113 or 114 to present the additional data while the guidance data is being presented during the transaction to the operator.

In an embodiment of 233, and at 235, the proximity and contextual transaction guidance manager presents the additional data as additional guidance data and additional feedback to the operator for the transaction. For example, the original guidance data can be a cautionary visual message to not access a scanner 115 at this point in the transaction while the additional guidance data is a visual message requesting the operator insert currency into a media depository 116, provide a card to a card reader 117, or take a printed receipt from printer 118.

In an embodiment, at 240, the proximity and contextual transaction guidance manager identifies an idle state of the terminal 110 after the transaction completes. The proximity and contextual transaction guidance manager obtains additional guidance data based on the idle state and presents the additional guidance data on the surface. This additional guidance data can provide a visual message that attempts to entice another customer to operate the terminal 110 for a transaction via promotional information, team spirit messages, etc.

In an embodiment, at 250, the proximity and contextual transaction guidance manager iterates to 220 for a next state of the transaction responsive to completion of a current state for the transaction and until a last transaction state is reached (e.g., a completed transaction). For each iteration, the proximity and contextual transaction guidance manager obtains additional guidance data for the next state and presents the additional guidance data on the surface or on a different surface adjacent to a different peripheral of the terminal 110 as new feedback to the operator for the progression of the transaction at the terminal 110.

Figure 3:
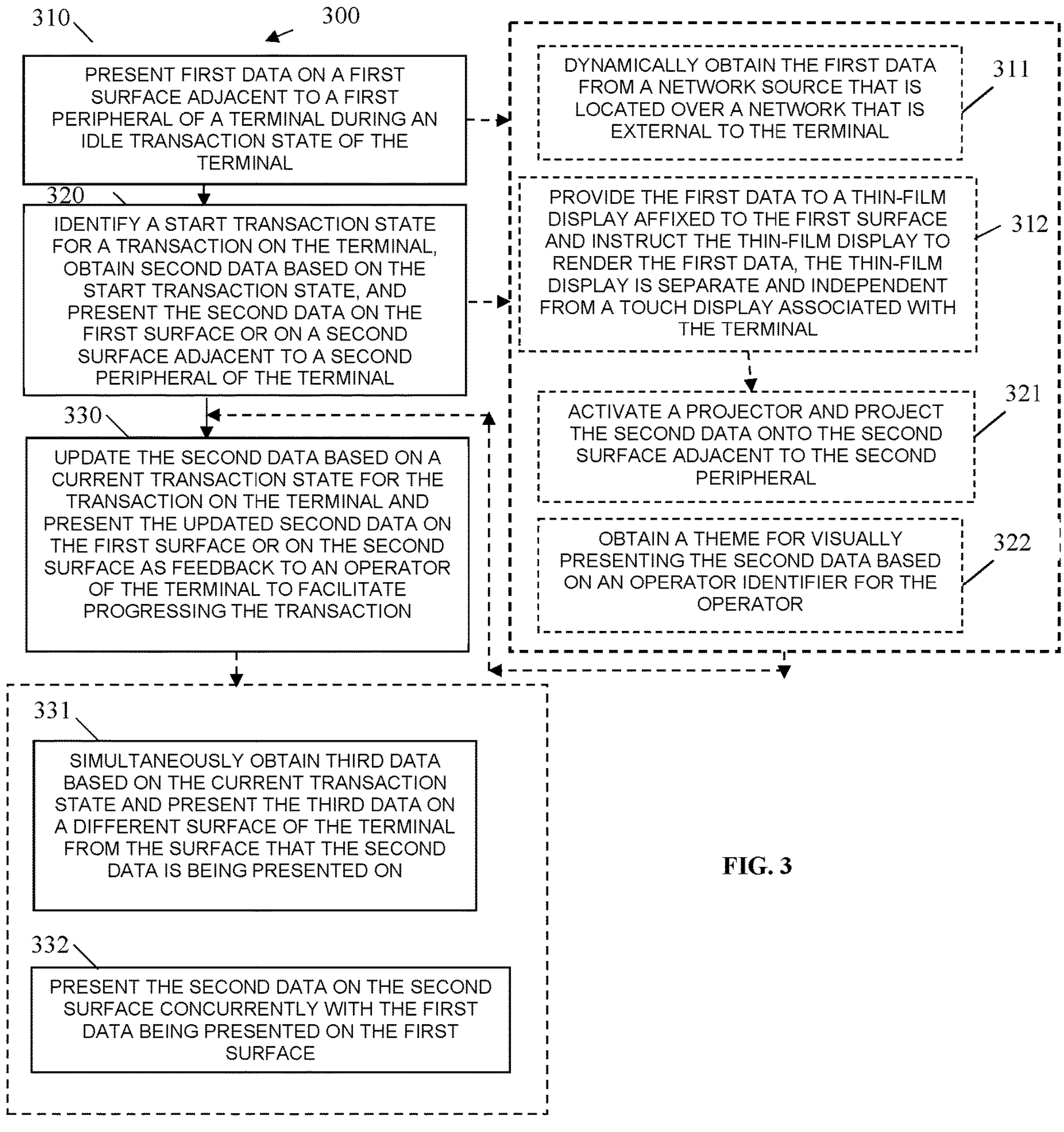
FIG. 3 is a flow diagram of a method for controlling, during a transaction, transaction guidance on a display situated on a surface of an SST, according to an example embodiment.

FIG. 3 is a flow diagram of a method 300 for controlling transaction guidance on a display situated on a surface of an SST during a transaction, according to an example embodiment. The software module(s) that implements the method 300 is referred to as a "transaction guidance controller." The transaction guidance controller is implemented as executable instructions programmed and residing within memory and/or a non-transitory computer-readable (processor-readable) storage medium and executed by one or more hardware processors of one or more hardware devices. The processors of the devices that execute the transaction guidance controller are specifically configured and programmed to process the transaction guidance controller. The transaction guidance controller has access to one or more networks during its processing. The networks can be wired, wireless, or a combination of wired and wireless.

In an embodiment, the device that executes the transaction guidance controller is SST 110. In an embodiment, multiple devices cooperate to execute the transaction guidance controller and the multiple devices include SST 110 and cloud 120.

In an embodiment, the transaction guidance controller is all or any combination of transaction manager 113, transaction guidance controller 114, guidance manager 123, promo manager, and/or method 200. The transaction guidance controller presents another and, in some ways, an enhanced processing perspective from that which was discussed above with respect to system 100A and method 200.

At 310, the transaction guidance controller presents first data on a first surface adjacent to a first peripheral of a terminal 110 during an idle state of the terminal. As discussed above this first data can be visual animations and/or messages to attract customers to the terminal 110 for transactions.

In an embodiment, at 311, the transaction guidance controller dynamically obtains the first data from a network source that is located over a network that is external to the terminal 110. That is, cloud 110 or retail/third-party server 130 can dynamically house and provide updated first data over a network to the terminal 110 for presentation on the first surface.

In an embodiment, at 312, the transaction guidance controller provides the first data to a thin-film display 119B affixed to or resting on the first surface. The transaction guidance controller instructs the thin-film display 119B to render the first data on the display 119. Moreover, the thin-film display 119B is separate and independent from a touch display associated with the terminal. That is, the thin-film display 119B is not used as a transaction input interface for any transaction.

At 320, the transaction guidance controller identifies a start transaction state for a transaction on the terminal 110. The transaction guidance controller obtains second data based on the start transaction state and presents the second data on the first surface or on a second surface adjacent to a second peripheral of the terminal 110.

In an embodiment of 312 and 320, at 321, the transaction guidance controller activates a projector 119A and projects the second data onto the second surface adjacent to the second peripheral. The first data presented on the thin-film display 119B can be changed or may remain the same as the second data that is projected by the projector 119A onto the second surface.

In an embodiment, at 322, the transaction guidance controller obtains a theme for visually presenting the second data based on an operator identifier for the operator of the terminal. The theme can include colors, logos, backgrounds, etc. within which the second data is presented on the first surface or the second surface.

At 330, the transaction guidance controller updates the second data based on a current state for the transaction on the terminal. The transaction guidance controller presents the updated second data on the first surface or on the second surface as positive or cautionary feedback to an operator of the terminal 110 to facilitate progression of the transaction to completion on the terminal.

In an embodiment, at 331, the transaction guidance controller simultaneously obtains third data based on the current state. The transaction guidance controller presents the third data on a different surface of the terminal 110 from the surface on which the second data is being presented. As such, multiple pieces of visual information can be presented during the transaction on two or more surfaces of the terminal 110 based on the current transaction state.

In an embodiment, at 332, the transaction guidance controller presents the second data on the second surface concurrently with presentation of the first data on the first surface. As such, the original idle state visual information can continue to be presented on the first surface as the second data updates and the updated second data is presented on the second surface.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

identifying, by a terminal, a first transaction state of a first transaction at a terminal;

obtaining, by the terminal, first guidance data based on the first transaction state, and projecting, via a projector of the terminal, the first guidance data onto a surface adjacent to a peripheral of the terminal, the peripheral comprising a scanner window for passing item codes, a currency slot for inserting currency, a card slot for inserting a payment or a loyalty card, or a wireless card reader for placing a wireless-enabled card, the first guidance data comprising an animation or a graphic that provides context-based real-time transaction guidance to an operator of the terminal that facilitates progression of the first transaction at the terminal from the first transaction state;

identifying, by the terminal, a second transaction state of a second transaction at the terminal after the first transaction completes; and obtaining, by the terminal, second guidance data based on the second transaction state, and projecting, via the projector, the second guidance data onto the surface adjacent to the peripheral, the second guidance data comprising cautionary feedback indicating to the operator, based on the second transaction state, that the operator should refrain from interacting with the peripheral.

2. The method of claim 1 further comprising:

identifying an idle state of the terminal after the first transaction or the second transaction completes;

obtaining additional guidance data based on the idle state; and projecting the additional guidance data onto the surface via the projector, and attracting a new operator to the terminal via the additional guidance data.

3. The method of claim 1 further comprising:

detecting a change in the first transaction state or the second transaction state;

iterating to the obtaining of the first guidance data or the second guidance data for a next transaction state of the first transaction or the second transaction responsive to the change in the first transaction state or the second transaction state and responsive to identifying completion of a current transaction state for the first transaction or the second transaction; and for each iteration:

obtaining additional guidance data for the next transaction state; and projecting, via the projector, the additional guidance data onto the surface or on a different surface adjacent to a different peripheral of the terminal as new feedback to the operator.

4. The method of claim 1, wherein obtaining further includes:

accessing a mapping maintained by the terminal; and identifying the first guidance data, the second guidance data, and the surface from the mapping linked to a particular transaction state identifier for the first transaction state and the second transaction state;

wherein the first transaction is completed before the second transaction commences at the terminal.

5. The method of claim 4, wherein identifying the first guidance data of the second guidance data further includes dynamically obtaining the first guidance data of the second guidance data from a link provided in the mapping to an external network-based location.

6. The method of claim 5, wherein identifying the first guidance data of the second guidance data further includes obtaining a visual theme for presenting the first guidance data or the second guidance data based on a loyalty identifier for the operator.

7. The method of claim 1, wherein presenting the first guidance data or the second guidance data further includes activating a projector of the terminal and projecting the first guidance data or the second guidance data onto the surface.

8. The method of claim 1, wherein presenting the first guidance data or the second guidance data further includes providing the first guidance data or the second guidance data to a display situated on the surface and instructing the display to render the first guidance data or the second guidance data on the display at the surface.

9. The method of claim 1, wherein presenting the first guidance data or the second guidance data further includes simultaneously presenting additional data on a different surface adjacent to a different peripheral of the terminal.

10. The method of claim 9, wherein simultaneously presenting further includes presenting the additional data as promotional data of a retailer.

11. The method of claim 9, wherein simultaneously presenting further includes presenting the additional data as additional guidance data and additional feedback for the first transaction or the second transaction, and wherein the first transaction is completed before the second transaction commences at the terminal.

12. A system comprising:

at least one server that comprises at least one processor; and the at least one processor executes instructions that cause the at least one processor to perform operations comprising:

receiving a first transaction state of a transaction terminal during a first transaction of an operator at the transaction terminal;

obtaining first guidance data and a surface identifier for a surface adjacent to a peripheral of the transaction terminal that is associated with the first guidance data based on a current transaction state for the first transaction;

instructing the transaction terminal to project via a projector of the transaction terminal the first guidance data onto the surface associated with the surface identifier as feedback to the operator, the peripheral comprising a scanner window for passing item codes, a currency slot for inserting currency, a card slot for inserting a payment or a loyalty card, or a wireless card reader for placing a wireless-enabled card, the first guidance data comprising an animation or a graphic that provides a context-based real-time transaction guidance to an operator of the transaction terminal that facilitates progression of the first transaction at the transaction terminal from the first transaction state, the first guidance data comprising affirmative guidance to the operator to perform a first action using the peripheral;

receiving a second transaction state of the transaction terminal during a second transaction at the transaction terminal after the first transaction completes;

obtaining second guidance data and the surface identifier for the surface adjacent to the peripheral of the transaction terminal that is associated with the second transaction;

instructing the transaction terminal to project via the projector the second guidance data onto the surface associated with the surface identifier, the second guidance data comprising cautionary feedback indicating to the operator based on the second transaction state that the operator should refrain from interacting with the peripheral; and iterating to the receiving of a next transaction state until a transaction state indicates that the second transaction completed on the transaction terminal.

13. The system of claim 12, wherein the operator is a customer performing a self-checkout and the transaction terminal is a self-service terminal.

* * * * *